United States Patent
Miyake

(10) Patent No.: US 12,461,534 B2
(45) Date of Patent: Nov. 4, 2025

(54) AUTOMATIC TRAVELING METHOD, AUTOMATIC TRAVELING SYSTEM, AND AUTOMATIC TRAVELING PROGRAM

(71) Applicant: Yanmar Holdings Co., Ltd., Osaka (JP)

(72) Inventor: Koji Miyake, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 272 days.

(21) Appl. No.: 18/116,189

(22) Filed: Mar. 1, 2023

(65) Prior Publication Data
US 2023/0280757 A1    Sep. 7, 2023

(30) Foreign Application Priority Data
Mar. 2, 2022   (JP) .................... 2022-031820

(51) Int. Cl.
  *G05D 1/00* (2024.01)
  *A01D 41/127* (2006.01)
(52) U.S. Cl.
  CPC ....... *G05D 1/0238* (2013.01); *A01D 41/1278* (2013.01); *G05D 1/0088* (2013.01)
(58) Field of Classification Search
  None
  See application file for complete search history.

(56) References Cited

U.S. PATENT DOCUMENTS

| | | | |
|---|---|---|---|
| 10,152,891 B2* | 12/2018 | Rusciolelli | G05D 1/0088 |
| 2007/0213892 A1 | 9/2007 | Jones et al. | |
| 2018/0319396 A1* | 11/2018 | Foster | B60W 30/0956 |
| 2019/0146513 A1* | 5/2019 | Tomita | B60W 30/10 701/50 |
| 2019/0163190 A1* | 5/2019 | Ono | G05D 1/672 |
| 2020/0133309 A1* | 4/2020 | Grundey | G05D 1/0238 |
| 2020/0363811 A1 | 11/2020 | Nishii | |
| 2021/0129834 A1* | 5/2021 | Gier | B60W 30/0956 |

FOREIGN PATENT DOCUMENTS

KR    20210091644 A    7/2021

* cited by examiner

*Primary Examiner* — Adam R Mott
*Assistant Examiner* — Alan Lindsay Ostrow
(74) *Attorney, Agent, or Firm* — Chris Mizumoto

(57) ABSTRACT

A traveling processing unit causes a work vehicle to automatically travel along a target route set within a field. A detection processing unit detects an obstacle located on an outer periphery of the field, while the work vehicle is traveling along the target route in a headland area of the field. In a case where the obstacle is a ridge, the traveling processing unit causes the work vehicle to travel along an avoidance route inside the field than the target route.

10 Claims, 12 Drawing Sheets

AUTOMATIC TRAVELING METHOD, AUTOMATIC TRAVELING SYSTEM, AND AUTOMATIC TRAVELING PROGRAM

CROSS-REFERENCE

This application claims foreign priority of JP2022-031820, filed Mar. 2, 2022, the disclosure of which is hereby incorporated by reference in its entirety.

TECHNICAL FIELD

The present invention relates to an automatic traveling method, an automatic traveling system, and an automatic traveling program for causing a work vehicle to automatically travel.

BACKGROUND ART

In recent years, progress in automation technology for agricultural machinery has led to introduction of a work vehicle that performs a work, while automatically traveling within a field. Conventionally, there is known a technique that allows a work vehicle to automatically travel along a shape of a field in an outer peripheral area of the field (see, for example, Patent Document 1).

PRIOR ART DOCUMENT

Patent Document

Patent Document 1: Japanese Unexamined Patent Application Publication No. 2020-099268

SUMMARY OF INVENTION

Technical Problem

Herein, in a case where a work machine is caused to automatically travel in an outer peripheral area of a field, for example, a distance between a ridge located on an outer periphery of the field and the work vehicle becomes close, and the work vehicle may come into contact with the ridge. Therefore, in the conventional art, a target route on the outermost periphery is set at a position away from the ridge by a predetermined distance. This makes it impossible for the work vehicle to automatically travel in the vicinity of the ridge, which may cause a problem that work efficiency is lowered.

An object of the present invention is to provide an automatic traveling method, an automatic traveling system, and an automatic traveling program that can improve work efficiency of a work vehicle in an outer peripheral area of a field.

Solution to Problem

An automatic traveling method according to the present invention includes: causing a work vehicle to automatically travel along a target route set within a field; detecting an obstacle located on an outer periphery of the field, while the work vehicle is traveling along the target route in an outer peripheral area of the field; and, in a case where the obstacle is an object to be avoided, causing the work vehicle to travel along an avoidance route that is located more inside the field than the target route.

An automatic traveling system according to the present invention includes: a traveling processing unit that causes a work vehicle to automatically travel along a target route set within a field; and a detection processing unit that detects an obstacle located on an outer periphery of the field, while the work vehicle is traveling along the target route in an outer peripheral area of the field. In a case where the obstacle is an object to be avoided, the traveling processing unit causes the work vehicle to travel along an avoidance route that is located more inside the field than the target route.

An automatic traveling program according to the present invention is an automatic traveling program causing one or more processors to execute: causing a work vehicle to automatically travel along a target route set within a field: detecting an obstacle located on an outer periphery of the field, while the work vehicle is traveling along the target route in an outer peripheral area of the field; and, in a case where the obstacle is an object to be avoided, causing the work vehicle to travel along an avoidance route that is located more inside the field than the target route.

Advantageous Effects of Invention

According to the present invention, it is possible to provide an automatic traveling method, an automatic traveling system, and an automatic traveling program that can improve work efficiency of a work vehicle in an outer peripheral area of a field.

DESCRIPTION OF EMBODIMENTS

The following embodiments are an example embodying the present invention, and are not intended to limit the technical scope of the present invention.

First Embodiment

Figure 1:
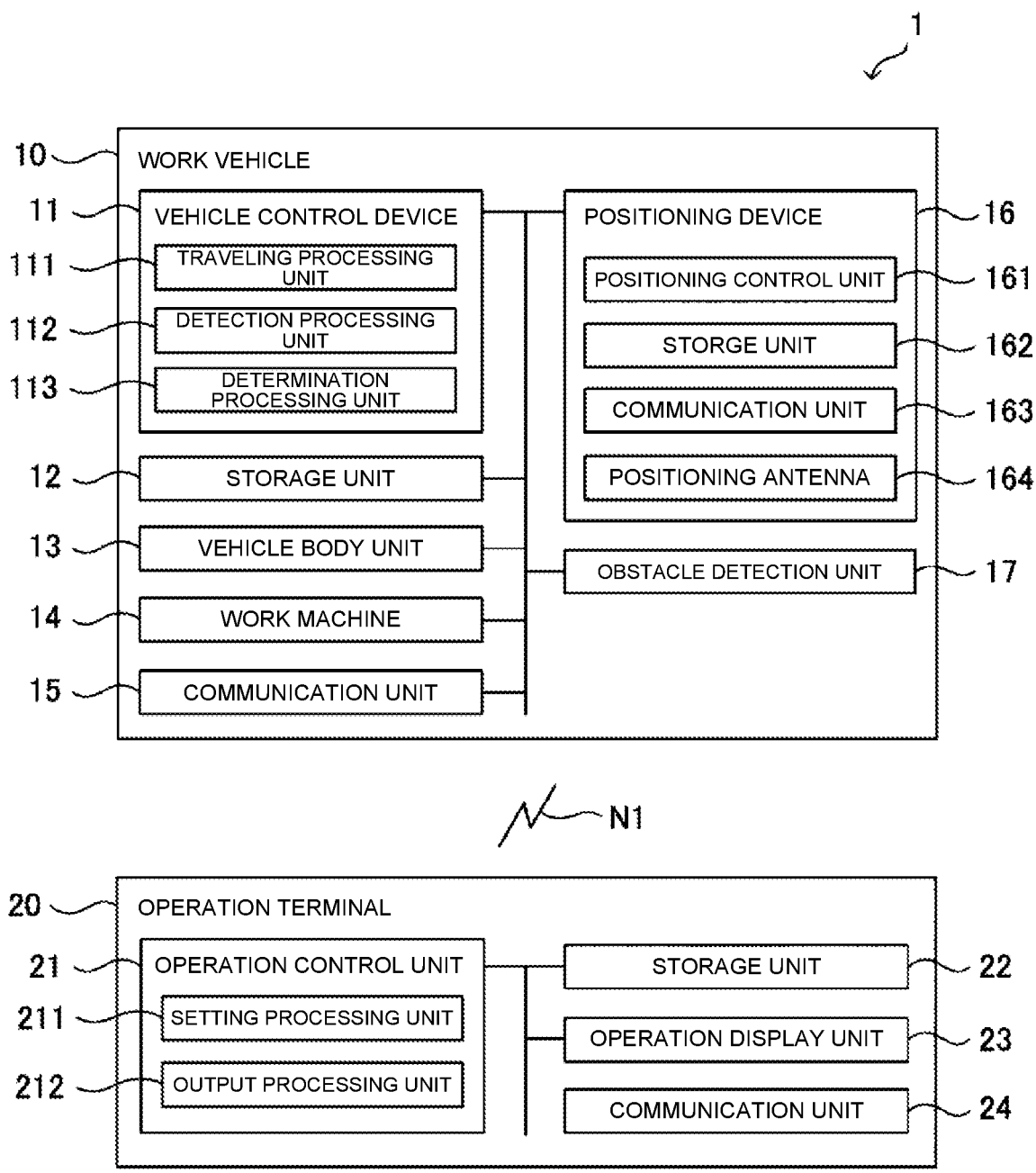
FIG. 1 is a block diagram illustrating a configuration of an automatic traveling system according to an embodiment of the present invention.

As illustrated in FIG. 1, an automatic traveling system 1 according to an embodiment of the present invention includes a work vehicle 10 and an operation terminal 20. The work vehicle 10 and the operation terminal 20 can communicate with each other via a communication network N1. For example, the work vehicle 10 and the operation terminal 20 can communicate with each other via a mobile phone network, a packet network, or a wireless LAN.

In the present embodiment, a case in which the work vehicle 10 is a rice transplanter is described as an example. Note that, as another embodiment, the work vehicle 10 may be a tractor, a combine harvester, a construction machine, a snow plow, or the like. The work vehicle 10 is an automatic traveling vehicle provided with a configuration that enables to automatically travel (autonomously travel) within a field registered in advance. For example, an operator registers a field as a work target, and sets a traveling route (target route) along which the work vehicle 10 is caused to automatically travel within the field. The work vehicle 10 automatically travels along a predetermined target route within the field, based on position information on a current position of the work vehicle 10 to be computed by a positioning device 16. The work vehicle 10 can also perform a predetermined work (e.g., a planting work), while automatically traveling within the field.

Figure 3:
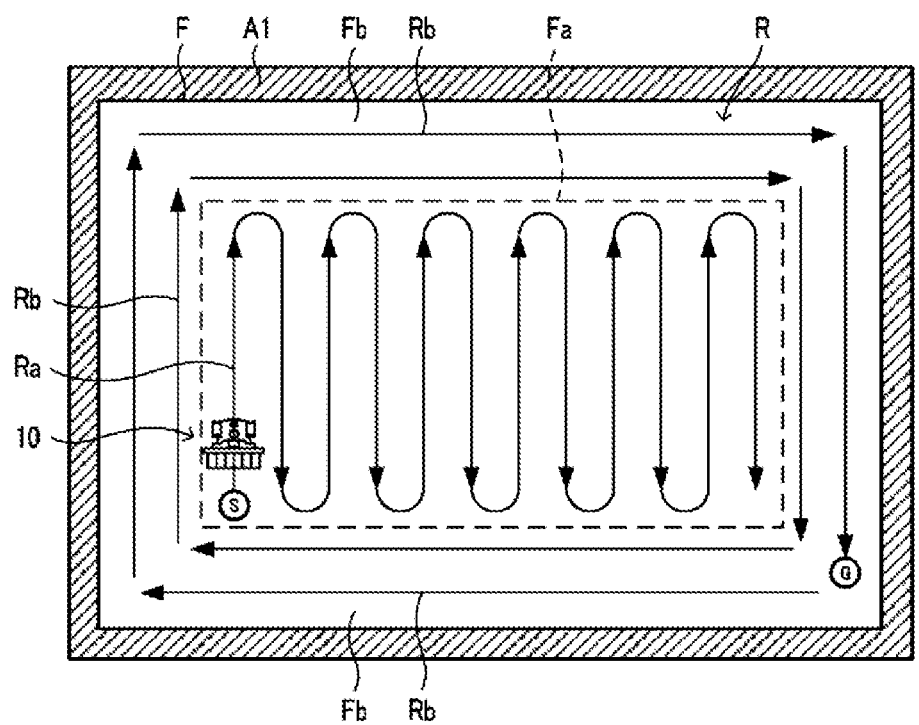
FIG. 3 is a diagram illustrating an example of a field and a target route according to the embodiment of the present invention.

For example, the work vehicle 10 automatically travels along a target route R within a field F illustrated in FIG. 3. The field F illustrated in FIG. 3 includes an inner area Fa, and a headland area Fb (outer peripheral area), and a ridge A1 (such as a bank) is formed on the outside of the field F in such a way as to surround the periphery of the field F. The target route R including a plurality of work routes is set in advance in the field F. For example, a work route Ra along which the work vehicle 10 reciprocally travels in parallel from a work start position S is set in the inner area Ra, and a work route Rb along which the work vehicle 10 travels spirally along an outer periphery toward a work end position G is set in the headland area Fb. The target route R is not limited to the route illustrated in FIG. 3, but may be set as appropriate according to a shape of the field F, a work content, and the like.

The work vehicle 10 starts automatic traveling from the work start position S, and performs a work within the inner area Fa, while reciprocally traveling along the work route Ra. Also, the work vehicle 10 performs a work within the headland area Fb, while traveling around along the work route Rb until the work end position G.

Herein, in a case where the work vehicle 10 is caused to automatically travel within an outer peripheral area (headland area Fb) of the field F, for example, a distance between the ridge A1 located on an outer periphery of the field F, and the work vehicle 10 becomes close, and the work vehicle 10 may come into contact with the ridge. For example, in a case where the work vehicle 10 travels along the ridge A1 in an outermost peripheral area of the headland area Fb, a work machine 14 of the work vehicle 10 may come into contact with the ridge A1. For this reason, in the conventional art, the target route R on the outermost periphery is set to a position away from the ridge A1 by a predetermined distance. This does not allow the work vehicle 10 to automatically travel in the vicinity of the ridge A1, which causes a problem that work efficiency is lowered. In contrast, an automatic traveling system 1 according to the present embodiment can improve work efficiency of the work vehicle 10 in an outer peripheral area of the field F, as described below.

Work Vehicle 10

Figure 2A:
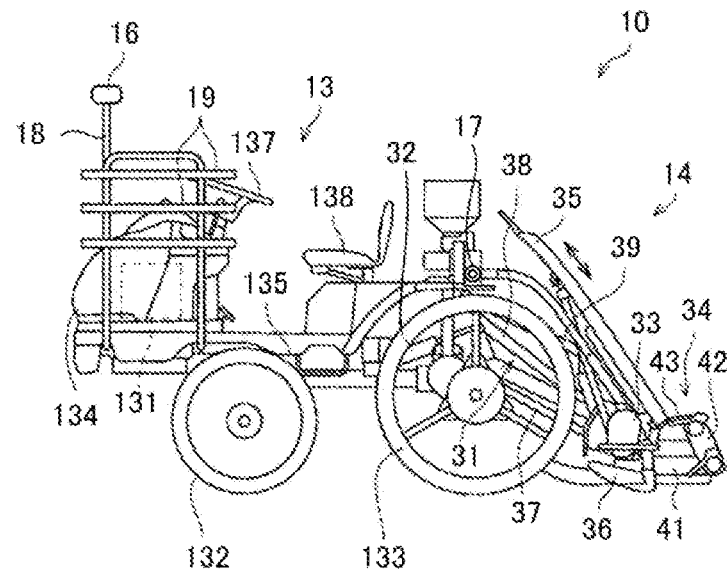
FIG. 2A is a side view illustrating an example of a work vehicle according to the embodiment of the present invention.
Figure 2B:
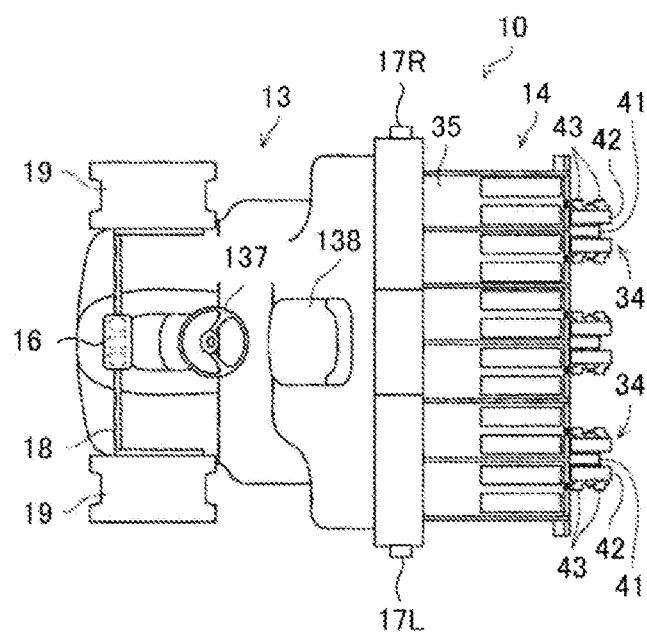
FIG. 2B is a plan view illustrating an example of the work vehicle according to the embodiment of the present invention.

As illustrated in FIG. 1, FIG. 2A, and FIG. 2B, the work vehicle 10 includes a vehicle control device 11, a storage unit 12, a vehicle body unit 13, the work machine 14, a communication unit 15, the positioning device 16, an obstacle detection unit 17, and the like. The vehicle control device 11 is electrically connected to the storage unit 12, the vehicle body unit 13, the work machine 14, the positioning device 16, the obstacle detection unit 17, and the like. Note that, the vehicle control device 11 and the positioning device 16 may be wirelessly communicable.

First, a rice transplanter, which is an example of the work vehicle 10, is described with reference to FIGS. 2A and 2B. FIG. 2A is a side view of the work vehicle 10 (rice transplanter), and FIG. 2B is a plan view of the work vehicle 10. The work vehicle 10 includes the vehicle body unit 13, a pair of left and right front wheels 132, a pair of left and right rear wheels 133, the work machine 14 (planting unit), and the like.

An engine (drive unit) 131 is disposed inside a hood 134 disposed on a front portion of the vehicle body unit 13. Power generated by the engine 131 is transmitted to the front wheels 132 and the rear wheels 133 via a transmission case 135. Power transmitted via the transmission case 135 is also transmitted to the work machine 14 via a PTO shaft 37 disposed on a rear portion of the vehicle body unit 13. Note that, the PTO shaft 37 is configured in such a way as to transmit power via a planting clutch (work clutch) (not illustrated). A driver's seat 138 on which an operator is seated is provided at a position between the front wheels 132 and the rear wheels 133 in a front-rear direction of the vehicle body unit 13.

Operating tools such as a steering wheel 137, a main shift lever (not illustrated), and a planting clutch lever (not illustrated) are disposed in front of the driver's seat 138. The steering wheel 137 is an operating tool for changing a steering angle of the work vehicle 10. The main shift lever is configured in such a way that at least "forward", "backward", and "seedling transfer" positions are selectable. When the main shift lever is operated to the "forward" position, power is transmitted in such a way that the front wheels 132 and the rear wheels 133 rotate in a direction in which the work vehicle 10 is moved forward. When the main shift lever is operated to the "backward" position, power is driven in such a way that the front wheels 132 and the rear wheels 133 rotate in a direction in which the work vehicle 10 is moved backward. When the main shift lever is operated to the "seedling transfer" position, transmission of power to the front wheels 132, the rear wheels 133, and the PTO shaft 37 is cut off. In addition, operating the planting clutch lever enables to switch between a transmission state in which the planting clutch transmits power to the PTO shaft 37 (i.e., the work machine 14), and a cut-off state in which the planting clutch does not transmit power to the PTO shaft 37 (i.e., the work machine 14).

The work machine 14 is connected to a rear portion of the vehicle body unit 13 via an elevating link mechanism 31. The elevating link mechanism 31 is constituted of a parallel link structure including a top link 39, a lower link 38, and the like. A lifting cylinder (lifting device) 32 is connected to the lower link 38. Extending and retracting the lifting cylinder 32 enables to raise and lower the entirety of the work machine 14. This allows to change a height of the work machine 14 between a lowered position where the work machine 14 is lowered, and a planting work is performed, and a raised position where the work machine 14 is raised, and a planing work is not performed. Although the lifting cylinder 32 is a hydraulic cylinder, an electric cylinder may also be used. The work machine 14 may also be raised and lowered by an actuator other than a cylinder.

The work machine 14 (planting unit) includes a planting input case 33, a plurality of planting units 34, a seedling stand 35, a plurality of floats 36, and the like.

Each planting unit 34 includes a planting transmission case 41 and a rotation case 42. Power is transmitted to the planting transmission case 41 via the PTO shaft 37 and the planting input case 33. The rotation case 42 is mounted on both sides of each planting transmission case 41 in a vehicle width direction. Two planting claws 43 are mounted on each rotation case 42 side by side in a traveling direction of the work vehicle 10. Planting one row of seedlings is performed by these two planting claws 43.

As illustrated in FIG. 2A, the seedling stand 35 is disposed in front of and above the planting unit 34, and is configured to be able to place a seedling mat. The seedling stand 35 is configured to be reciprocally movable for horizontal feeding (slidable in a horizontal direction). The seedling stand 35 is also configured to be able to intermittently transport a seedling mat downward for vertical feeding at a reciprocating moving end of the seedling stand 35. This configuration allows the seedling stand 35 to supply seedlings on a seedling mat to each planting unit 34. In this way, the work vehicle 10 can sequentially supply seedlings to each planting unit 34, and continuously plant seedlings.

The float 36 illustrated in FIG. 2A is provided at a lower portion of the work machine 14, and disposed in such a way that a lower surface of the float 36 can come into contact with the ground. Contact of the float 36 with the ground allows preparation of a surface of a rice field before planting seedlings. The float 36 is also provided with a float sensor (not illustrated) that detects a swing angle of the float 36. The swing angle of the float 36 is associated with a distance between a surface of a rice field and the work machine 14. The work vehicle 10 can keep a height of the work machine 14 with respect to the ground to a constant level by operating the lifting cylinder 32, based on a swing angle of the float 36, and raising and lowering the work machine 14.

A spare seedling stand 19 is disposed outside the hood 134 in the vehicle width direction, and can carry a seedling box containing spare mat seedlings. Upper portions of a pair of left and right spare seedling stands 19 are connected to each other by a connecting frame 18 extending in an up-down direction and in the vehicle width direction. The positioning device 16 is disposed at a middle of the connecting frame 18 in the vehicle width direction. A positioning control unit 161, a storage unit 162, a communication unit 163, and a positioning antenna 164 (see FIG. 1) are disposed inside the positioning device 16. The positioning antenna 164 can receive a radio wave from a positioning satellite constituting a satellite positioning system (GNSS). Performing known positioning computation, based on the radio wave enables to acquire a position of the work vehicle 10.

Figure 4A:
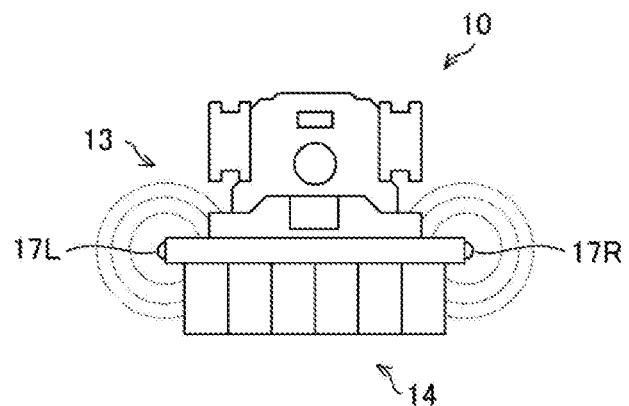
FIG. 4A is a diagram illustrating a specific example of an obstacle detection unit of a work vehicle according to a first embodiment of the present invention.

An obstacle detection unit 17 is provided on both side surfaces of the vehicle body unit 13. For example, as illustrated in FIG. 2B, an obstacle detection unit 17L capable of detecting an obstacle in a left direction of the work vehicle 10 is provided on the left side surface of the vehicle body unit 13, and an obstacle detection unit 17R capable of detecting an obstacle in a right direction of the work vehicle 10 is provided on the right side surface of the vehicle body unit 13. The obstacle detection unit 17 is constituted of a sensor that detects an obstacle in a predetermined detection area by using, for example, an infrared ray, an ultrasonic wave, and the like. For example, the obstacle detection unit 17 may be a LIDAR sensor (distance sensor) capable of measuring a distance to a measurement target (obstacle) in a three-dimensional manner by using a laser, or a sonar sensor including a plurality of sonars capable of measuring a distance to a measurement target by using an ultrasonic wave. FIG. 4A schematically illustrates a plan view of the work vehicle 10 in a case where the obstacle detection unit 17 is constituted of an optical sensor. The obstacle detection unit 17L is provided on the left side surface of the vehicle body unit 13 of the work vehicle 10, and the obstacle detection unit 17R is provided on the right side surface of the vehicle body unit 13 of the work vehicle 10.

Note that, a dotted line illustrated in FIG. 4A indicates a target area (determination area) for determination processing of determining whether an obstacle is an object to be avoided, in a case where the obstacle detection unit 17 detects the obstacle. Details will be described later, but, for example, in a case where the obstacle detection unit 17 detects an obstacle within the determination area, the vehicle control device 11 performs determination processing of determining whether the obstacle is an object to be avoided (e.g., a ridge A1). On the other hand, in a case where the obstacle detection unit 17 detects an obstacle within the detection area and outside the determination area, the vehicle control device 11 omits the determination processing. The determination area is set, for example, to a radius of 30 cm to 50 cm with respect to a mounting position of the obstacle detection unit 17 as a center. Note that, the detection area of the obstacle detection unit 17 is set to an area larger than the determination area.

The obstacle is, for example, the ridge A1, a water intake, a utility pole, materials temporarily placed within the field F, a person, and the like. The obstacle detection unit 17 is configured to be able to detect the obstacle within the detection area. When the obstacle detection unit 17 detects the obstacle, the obstacle detection unit 17 transmits a detection result (measurement information to be described later) to the vehicle control device 11.

Figure 4B:
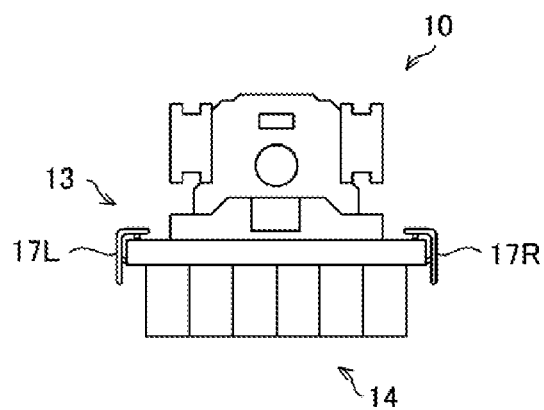
FIG. 4B is a diagram illustrating a specific example of an obstacle detection unit of a work vehicle according to a second embodiment of the present invention.

As another embodiment, the obstacle detection unit 17 may be constituted of a physical detection device (physical sensor). FIG. 4B schematically illustrates a plan view of the work vehicle 10 in a case where the obstacle detection unit 17 is constituted of a contact sensor (or a switch). The obstacle detection unit 17 detects an obstacle, in a case where the obstacle comes into contact with the obstacle detection unit 17. In the first embodiment, a case in which the obstacle detection unit 17 is an optical sensor (see FIG. 4A) is described as an example. A configuration in a case where the obstacle detection unit 17 is a physical sensor (see FIG. 4B) is described later in the [Second Embodiment].

The storage unit 12 is a non-volatile storage unit such as a hard disk drive (HDD) or a solid state drive (SSD) that stores various pieces of information. The storage unit 12 stores a control program such as an automatic traveling program for causing the vehicle control device 11 to perform automatic traveling processing. For example, the automatic traveling program is non-transitorily recorded in a computer-readable recording medium such as a flash ROM, an EEPROM, a CD, or a DVD, read by a predetermined reading device (not illustrated), and stored in the storage unit 12. Note that, the automatic traveling program may be downloaded from a server (not illustrated) to the work vehicle 10 via the communication network N1, and stored in the storage unit 12. Also, the storage unit 12 may store route data on the target route R to be generated in the operation terminal 20.

The vehicle control device 11 includes a control device such as a CPU, a ROM, and a RAM. The CPU is a processor that executes various pieces of arithmetic processing. The ROM is a non-volatile storage unit that stores in advance a control program such as a BIOS and an OS for causing the CPU to execute various pieces of arithmetic processing. The RAM is a volatile or non-volatile storage unit that stores various pieces of information, and is used as a temporary storage memory (work area) in which the CPU executes various pieces of processing. Further, the vehicle control device 11 controls the work vehicle 10 by causing the CPU to execute various control programs stored in advance in the ROM or the storage unit 12.

The vehicle control device 11 controls an operation of the work vehicle 10 in response to various operations by the user with respect to the work vehicle 10. The vehicle control device 11 also performs automatic traveling processing of the work vehicle 10, based on a current position of the work vehicle 10 to be computed by the positioning device 16, and the target route R set in advance.

As illustrated in FIG. 1, the vehicle control device 11 includes various processing units such as a traveling processing unit 111, a detection processing unit 112, and a determination processing unit 113. Note that, the vehicle control device 11 functions as the various processing units by causing the CPU to execute various pieces of processing according to the automatic traveling program. Also, a part or all of the processing units may be constituted of an electronic circuit. Note that, the automatic traveling program may be a program for causing a plurality of processors to function as the processing units.

The traveling processing unit 111 controls traveling of the work vehicle 10. Specifically, the traveling processing unit 111 causes the work vehicle 10 to automatically travel along the target route R set within the field F. For example, when the traveling processing unit 111 acquires a traveling start instruction from the operation terminal 20, the traveling processing unit 111 starts automatic traveling of the work vehicle 10. For example, in a case where a current position of the work vehicle 10 is a position that satisfies a traveling start condition, when an operator presses a start button on an operation screen of the operation terminal 20, the operation terminal 20 outputs a traveling start instruction to the work vehicle 10. When the traveling processing unit 111 acquires the traveling start instruction from the operation terminal 20, the traveling processing unit 111 causes the work vehicle 10 to start automatic traveling along the target route R.

Further, when the traveling processing unit 111 acquires a traveling stop instruction from the operation terminal 20, the traveling processing unit 111 stops automatic traveling of the work vehicle 10. For example, when the operator presses a temporary stop button on an operation screen of the operation terminal 20, the operation terminal 20 outputs a traveling stop instruction to the work vehicle 10.

The traveling processing unit 111 also controls traveling of the work vehicle 10, based on a detection result by the obstacle detection unit 17. Traveling control based on the detection result is described later.

The detection processing unit 112 acquires a detection result (measurement information) from the obstacle detection unit 17. Also, the detection processing unit 112 detects an obstacle located on an outer periphery of the field F, while the work vehicle 10 is traveling along the target route R in an outer periphery area (headland area Fb) of the field F. Specifically, the detection processing unit 112 acquires measurement information on each detection area from the obstacle detection units 17L and 17R. For example, in a case where an obstacle enters the detection area, the detection processing unit 112 acquires a measurement distance (distance from the obstacle detection unit 17 to the obstacle) to be measured by the obstacle detection unit 17. The detection processing unit 112 also determines a position and a shape of the obstacle, based on the measurement information. The detection processing unit 112 may be included in a device (detection device) different from the vehicle control device 11. The detection device may also be configured to include the obstacle detection unit 17 and the detection processing unit 112.

The determination processing unit 113 determines an obstacle detected by the obstacle detection unit 17. Specifically, the determination processing unit 113 performs determination processing of determining whether an obstacle detected within the determination area is an object to be avoided. For example, the determination area is set within a range of a radius of 30 cm from a mounting position of the obstacle detection unit 17. In this case, the determination processing unit 113 performs the determination processing, based on the measurement distance to be acquired from the detection processing unit 112, in a case where the obstacle detection unit 17 detects an obstacle within the determination area.

For example, the determination processing unit 113 detects an edge of an obstacle, based on a position and a shape of the obstacle detected from the measurement information by the detection processing unit 112, and determines whether the obstacle is the ridge A1, based on whether a boundary of the obstacle is continuous. The determination processing unit 113 determines that the obstacle is the ridge A1, in a case where the boundary of the obstacle is continuous, and the detected position is determined as a point group. On the other hand, in a case where the boundary of the obstacle is not continuous, and the detected position is determined as a point, the determination processing unit 113 determines that the obstacle is an object (such as a person) other than the ridge A1.

The traveling processing unit 111 controls automatic traveling of the work vehicle 10, based on a determination result of the determination processing unit 113. Specifically, in a case where the determination processing unit 113 determines that the obstacle is the ridge A1, the traveling processing unit 111 causes the work vehicle 10 to perform avoidance traveling of avoiding the ridge A1. A specific example of the avoidance traveling is described with reference to FIGS. 5 to 7.

Figure 5:
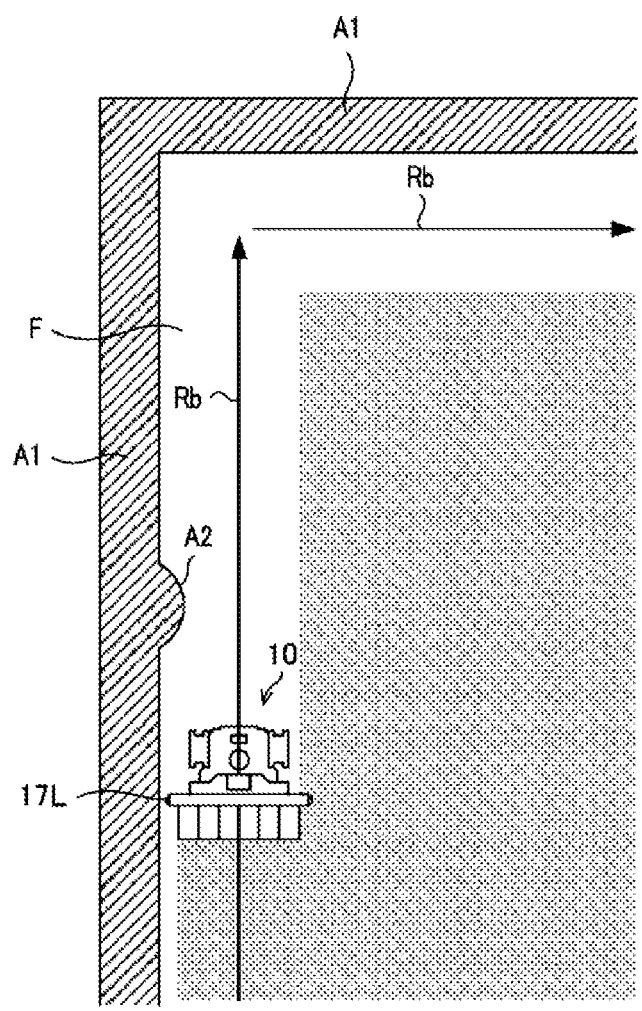
FIG. 5 is a diagram illustrating an example of a traveling method of a work vehicle according to the first embodiment of the present invention.

FIG. 5 illustrates a state in which the work vehicle 10 is automatically traveling along the work route Rb on the outermost periphery of the headland area Fb. In the state illustrated in FIG. 5, since a distance between the work vehicle 10 and the ridge A1 on the left side is equal to or more than 30 cm, and the ridge A1 is outside the determination area, the determination processing unit 113 does not perform the determination processing, assuming that there is no risk that the work vehicle 10 comes into contact with the ridge A1.

Subsequently, when the work vehicle 10 moves straight ahead along the work route Rb, the obstacle detection unit 17L detects an obstacle at a position illustrated in FIG. 6. The obstacle is a part of the ridge A1 partially protruding into the field F. The detection processing unit 112 determines a position and a shape of the obstacle, based on measurement information of the obstacle detection unit 17L. Since the protruding portion of the obstacle is included in the determination area, the determination processing unit 113 determines whether the obstacle is the ridge A1, based on the position and the shape of the obstacle. Herein, since a boundary of the obstacle has continuity, and is determined as a point group, the determination processing unit 113 determines that the obstacle is the ridge A1.

When the determination processing unit 113 determines that the obstacle is the ridge A1, the traveling processing unit 111 sets an avoidance route r1 to a position where the work route Rb (target route R) is offset to the inside of the field F. For example, the traveling processing unit 111 sets the avoidance route r1 to a position where the target route R is offset by a distance (offset amount L1) according to a protruding width of a protruding portion of the ridge A1. Note that, the offset amount L1 may be set according to the protrusion width, or may be set to a predetermined distance in advance. The traveling processing unit 111 causes the work vehicle 10 to travel along the avoidance route r1 inside the field F than the target route R.

Figure 6:
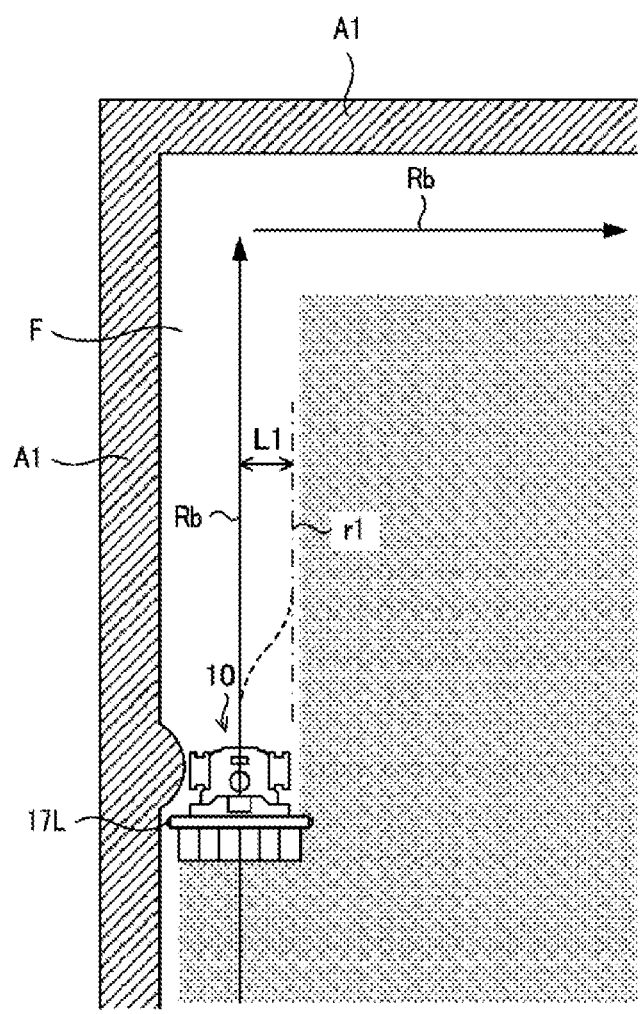
FIG. 6 is a diagram illustrating an example of the traveling method of the work vehicle according to the first embodiment of the present invention.

For example, when the traveling processing unit 111 sets the avoidance route r1, the traveling processing unit 111 changes the traveling direction of the work vehicle 10 to the direction of the avoidance route r1 (see FIG. 6). This allows the work vehicle 10 to move from the position where the ridge A1 is detected to the avoidance route r1, and to automatically travel along the avoidance route r1 (see FIG. 7).

Figure 7:
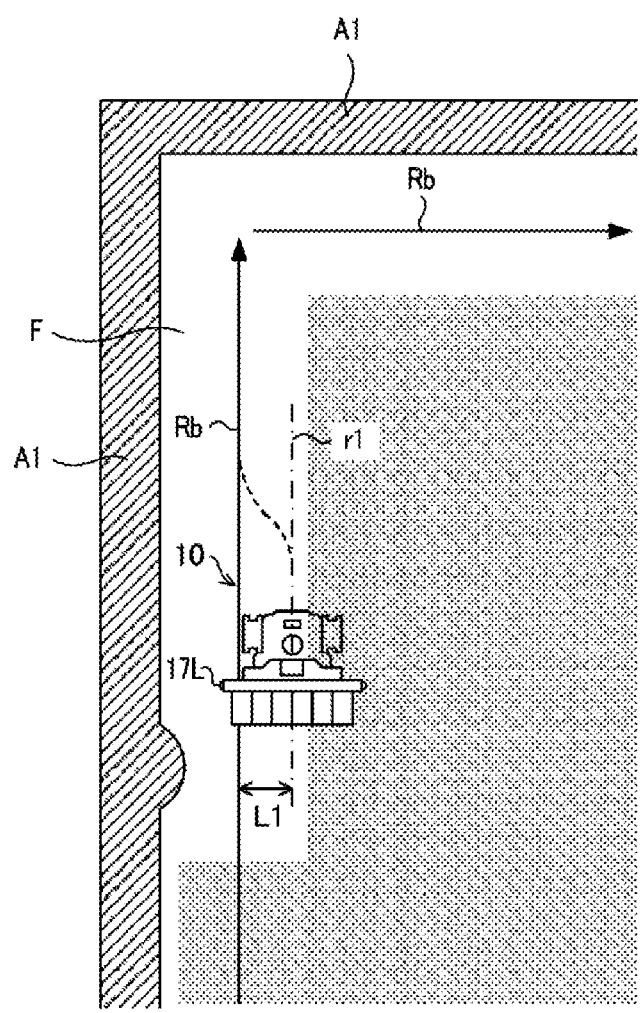
FIG. 7 is a diagram illustrating an example of the traveling method of the work vehicle according to the first embodiment of the present invention.

Subsequently, in a case where the work vehicle 10 has traveled along the avoidance route r1, and passed the ridge A1, the traveling processing unit 111 causes the work vehicle 10 to return to the target route R (work route Rb). For example, as illustrated in FIG. 7, when the work vehicle 10 has traveled straight ahead along the avoidance route r1, and the determination area no longer includes the ridge A1 (protruding portion), the traveling processing unit 111 changes the traveling direction of the work vehicle 10 to the direction of the work route Rb (see FIG. 7). This allows the work vehicle 10 to return to the original work route Rb from the avoidance route r1, and to automatically travel along the work route Rb.

According to the configuration described above, the work vehicle 10 can automatically travel on the outermost periphery of the field F along the ridge A1. Also, in a case where the work vehicle 10 detects the ridge A1, while automatically traveling on the outermost periphery, the work vehicle 10 can maintain automatic traveling by traveling along the avoidance route r1 in such a way as not to come into contact with the ridge A1. Also, by setting the determination area (see FIG. 4A) for determining whether the obstacle is an object to be avoided, it becomes possible to cause the work vehicle 10 to automatically travel along the ridge A1 on the outermost periphery of the field F, while maintaining a distance between the object to be avoided and the work vehicle 10 to a constant value.

Note that, in a case where the determination processing unit 113 determines that the obstacle is not the ridge A1, the traveling processing unit 111 stops automatic traveling of the work vehicle 10. In this case, the traveling processing unit 111 resumes automatic traveling of the work vehicle 10, in a case where the obstacle has moved, or in a case where an instruction operation by the operator is accepted.

In a case where the position of the obstacle detected by the detection processing unit 112 is outside the determination area, the traveling processing unit 111 maintains automatic traveling of the work vehicle 10 along the target route R.

In this way, the vehicle control device 11 performs processing of detecting an obstacle located on an outer periphery of the field F, while the work vehicle 10 is traveling along the target route R in an outer peripheral area of the field F, and in a case where the obstacle is an object to be avoided (e.g., the ridge A1), the vehicle control device 11 performs processing of causing the work vehicle 10 to travel along the avoidance route r1 inside the field F than the target route R.

Operation Terminal 20

As illustrated in FIG. 1, the operation terminal 20 is an information processing device including an operation control unit 21, a storage unit 22, an operation display unit 23, a communication unit 24, and the like. The operation terminal 20 may be constituted of a mobile terminal such as a tablet terminal or a smartphone.

The communication unit 24 is a communication interface that connects the operation terminal 20 to the communication network N1 wiredly or wirelessly, and performs data communication with an external device such as one or more work vehicles 10 via the communication network N1 in accordance with a predetermined communication protocol.

The operation display unit 23 is a user interface including a display unit such as a liquid crystal display or an organic EL display that displays various pieces of information, and an operation unit such as a touch panel that accepts an operation, a mouse, or a keyboard. An operator can perform, on an operation screen to be displayed on the display unit, an operation of registering various pieces of information (such as work vehicle information, field information, and work information to be described later) by operating the operation unit. For example, the operator performs, on the operation unit, an operation of registering the field F as a work target.

The operator can also perform a traveling start instruction, a traveling stop instruction, and the like with respect to the work vehicle 10 by operating the operation unit. Furthermore, the operator can recognize, at a position away from the work vehicle 10, a traveling state of the work vehicle 10 that automatically travels within the field F along the target route R by a traveling trajectory to be displayed on the operation terminal 20.

The storage unit 22 is a non-volatile storage unit such as an HDD or an SSD that stores various pieces of information. The storage unit 22 stores a control program for causing the operation control unit 21 to perform predetermined processing. For example, the control program is non-transitorily recorded in a computer-readable recording medium such as a flash ROM, an EEPROM, a CD, or a DVD, read by a predetermined reading device (not illustrated), and stored in the storage unit 22. Note that, the control program may be downloaded from a server (not illustrated) to the operation terminal 20 via the communication network N1, and stored in the storage unit 22.

In addition, a dedicated application for causing the work vehicle 10 to automatically travel is installed in the storage unit 22. The operation control unit 21 activates the dedicated application, and performs setting processing on various pieces of information related to the work vehicle 10, generation processing of the target route R of the work vehicle 10, an automatic traveling instruction with respect to the work vehicle 10, and the like.

In addition, the storage unit 22 stores data such as work vehicle information being information related to the work vehicle 10, and target route information being information related to the target route R. The work vehicle information includes information such as a vehicle number and a model number for each work vehicle 10. The vehicle number is identification information of the work vehicle 10. The model number is a model number of the work vehicle 10.

Note that, the storage unit 22 may store the work vehicle information related to one work vehicle 10, or may store the work vehicle information related to a plurality of work vehicles 10. For example, in a case where a specific operator owns a plurality of work vehicles 10, the work vehicle information related to each work vehicle 10 is stored in the storage unit 22.

The target route information includes information such as a route name, a field name, an address, a field area, and a work time for each target route R. The route name is a route name of the target route R generated in the operation terminal 20. The field name is a name of the field F as a work target, for which the target route R is set. The address is an address of the field F. The field area is an area of the field F. The work time is a time required for a work in the field F by the work vehicle 10.

Note that, the storage unit 22 may store the target route information related to one target route R, or may store the target route information related to a plurality of target routes R. For example, in a case where a specific operator generates a plurality of target routes R with respect to one or more fields F owned by himself/herself, the storage unit 22 stores the target route information related to each target route R. Note that, one target route R may be set for one field F, or a plurality of target routes R may be set for one field F.

The storage unit 22 may store position information on the ridge A1 that is detected while the work vehicle 10 is traveling along the target route R. For example, as illustrated in FIG. 7, in a case where the work vehicle 10 travels along the avoidance route R1, the work vehicle 10 travels at a position (in an already worked area) of an already planted crop, which may adversely affect the crop. In this case, for example, in a work next year and thereafter, it becomes possible to work using position information on the ridge A1 stored in the storage unit 22. Specifically, in the field F illustrated in FIG. 7, the work vehicle 10 is expected to travel along the avoidance route r1 in a process of one step before a work in a process for an outer periphery (outermost periphery). Therefore, the work vehicle 10 performs a row stop operation on a side of the already worked area, and is prevented from planting a crop. In the example illustrated in FIG. 7, the work vehicle 10 performs a row stop operation for two rows on the right side that are included in the already worked area. This configuration enables to prevent an adverse effect on a crop when the work vehicle 10 travels along the avoidance route r1.

Note that, as another embodiment, a part or all of pieces of information such as the work vehicle information and the target route information may be stored in a server accessible from the operation terminal 20. The operator may perform an operation of registering the work vehicle information and the target route information in the server (e.g., a personal computer, a cloud server, or the like).

The operation control unit 21 includes a control device such as a CPU, a ROM, and a RAM. The CPU is a processor that executes various pieces of arithmetic processing. The ROM is a non-volatile storage unit that stores in advance a control program such as a BIOS and an OS for causing the CPU to execute various pieces of arithmetic processing. The RAM is a volatile or non-volatile storage unit that stores various pieces of information, and is used as a temporary storage memory for various pieces of processing to be executed by the CPU. Further, the operation control unit 21 controls the operation terminal 20 by causing the CPU to execute various control programs stored in advance in the ROM or the storage unit 22.

As illustrated in FIG. 1, the operation control unit 21 includes various processing units such as a setting processing unit 211, and an output processing unit 212. Note that, the operation control unit 21 functions as the various processing units by causing the CPU to execute various pieces of processing in accordance with the control program. Also, a part or all of the processing units may be constituted of an electronic circuit. Note that, the control program may be a program for causing a plurality of processors to function as the processing units.

Figure 8:
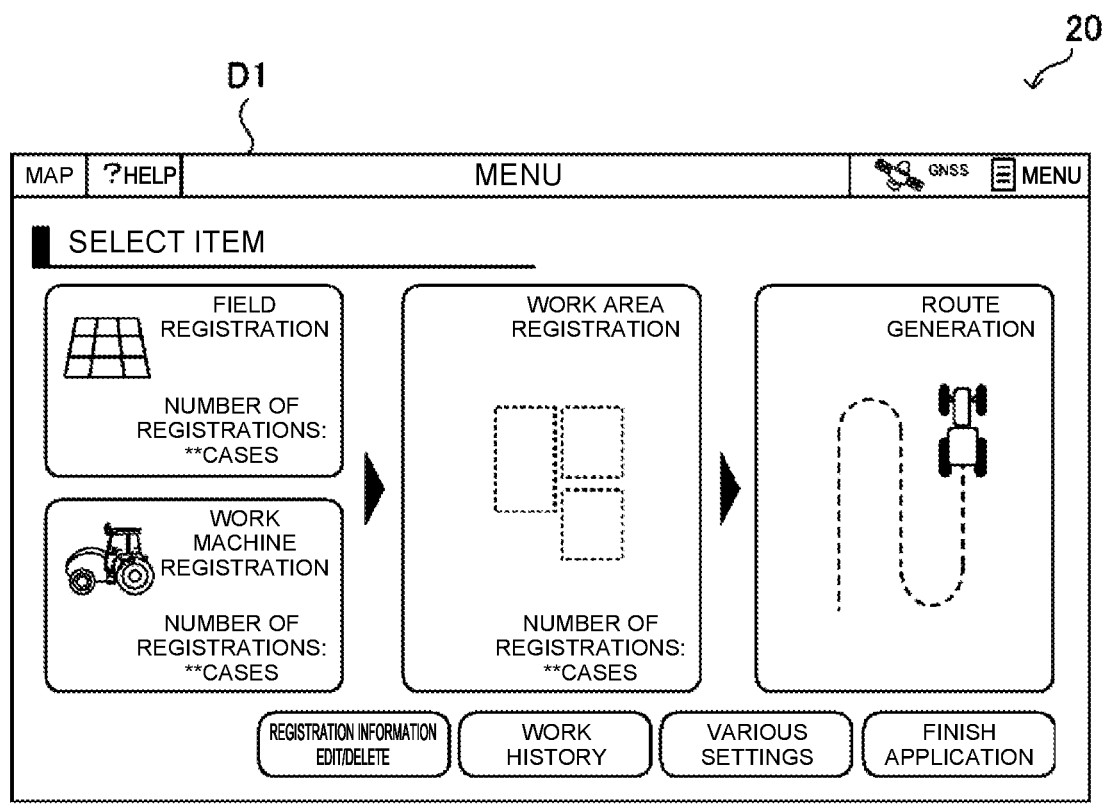
FIG. 8 is a diagram illustrating an example of an operation screen to be displayed on an operation terminal according to the embodiment of the present invention.

The setting processing unit 211 sets information related to the work vehicle 10 (hereinafter, referred to as "work vehicle information"), information related to the field F (hereinafter, referred to as "field information"), and information as to how a work is specifically performed (hereinafter, referred to as "work information"). The setting processing unit 211 accepts a setting operation by the operator on a setting screen D1 illustrated in FIG. 8, for example, and registers each piece of setting information.

Specifically, regarding information such as a model number of the work vehicle 10, a position where the positioning antenna 164 is mounted on the work vehicle 10, a type of the work machine 14, a size and a shape of the work machine 14, a position of the work machine 14 with respect to the work vehicle 10, a traveling speed and an engine speed of the work vehicle 10 during a work, and a traveling speed and an engine speed of the work vehicle 10 during turning, the setting processing unit 211 sets the information by performing a registration operation on the operation terminal 20 by the operator.

Regarding information such a position and a shape of the field F, the work start position S at which a work is started, the work end position G at which a work is finished, and a work direction, the setting processing unit 211 also sets the information by performing a registration operation on the operation terminal 20.

Information on a position and a shape of the field F can be automatically acquired, for example, by allowing the operator to board the work vehicle 10 and drive the work vehicle 10 in such a way as to travel around along an outer periphery of the field F, and recording a transition of position information of the positioning antenna 164 at this occasion. Further, a position and a shape of the field F can also be acquired by allowing the operator to operate the operation terminal 20 in a state that a map is displayed on the operation terminal 20, and based on a polygonal shape acquired by determining a plurality of points on the map. An area to be determined by the acquired position and shape of the field F is an area (traveling area) where the work vehicle 10 is allowed to travel.

The setting processing unit 211 is also configured in such a way that presence or absence of a cooperative work by a work vehicle 10 (unmanned tractor) and a manned work vehicle 10, the number of skips, which is the number of work routes to be skipped in a case where the work vehicle 10 turns around in a headland, a width of a headland, a width of a non-cultivated field, and the like are settable as work information.

For example, the setting processing unit 211 sets a work area within the registered field F where a work is actually performed. For example, when the operator selects "work area registration" on the setting screen D1 (see FIG. 8), and selects the field F for which a work area is registered, the setting processing unit 211 displays a registration screen (map screen) on which the work start position S and the work end position G are registered. The operator registers the work start position S and the work end position G at any position within the field F on the registration screen.

The setting processing unit 211 also generates the target route R along which the work vehicle 10 is caused to automatically travel within the field F, based on each piece of the setting information. For example, when the operator selects "route generation" on the setting screen D1 (see FIG. 8), the setting processing unit 211 causes to display a registration screen (not illustrated) for generating a route. After the operator registers, on the registration screen, each piece of information such as the field F, the work machine 14, a turning method, a headland, a vehicle speed, and an engine speed, the operator performs a route generation instruction. Upon acquiring the route generation instruction, the setting processing unit 211 generates the target route R, based on the work start position S, the work end position G, and each piece of the information.

For example, as illustrated in FIG. 3, the setting processing unit 211 generates the target route R including the work start position S, the work end position G, and the work routes Ra and Rb. The setting processing unit 211 registers the generated target route R in association with the field F.

The output processing unit 212 outputs route data on the target route R to the work vehicle 10. For example, when the operator selects the field F as a work target, and a work route (target route R), and performs a work start operation, the output processing unit 212 outputs route data on the target route R associated with the field F to the work vehicle 10.

When the work vehicle 10 receives the route data on the target route R generated in the operation terminal 20, the work vehicle 10 stores the data in the storage unit 12. In addition, in a case where the travel start condition is satisfied, the work vehicle 10 starts automatic traveling in response to a traveling start instruction by the operator. While the work vehicle 10 is automatically traveling, the operator can recognize a traveling state within the field F on the operation terminal 20.

Note that, the operation terminal 20 may be accessible to a web site (agricultural support site) of agricultural support services provided by a server (not illustrated) via the communication network N1. In this case, the operation terminal 20 is able to function as an operation terminal for the server by causing the operation control unit 21 to execute a browser program. Further, the server includes each processing unit described above, and performs each piece of processing.

Automatic Traveling Processing

Figure 9:
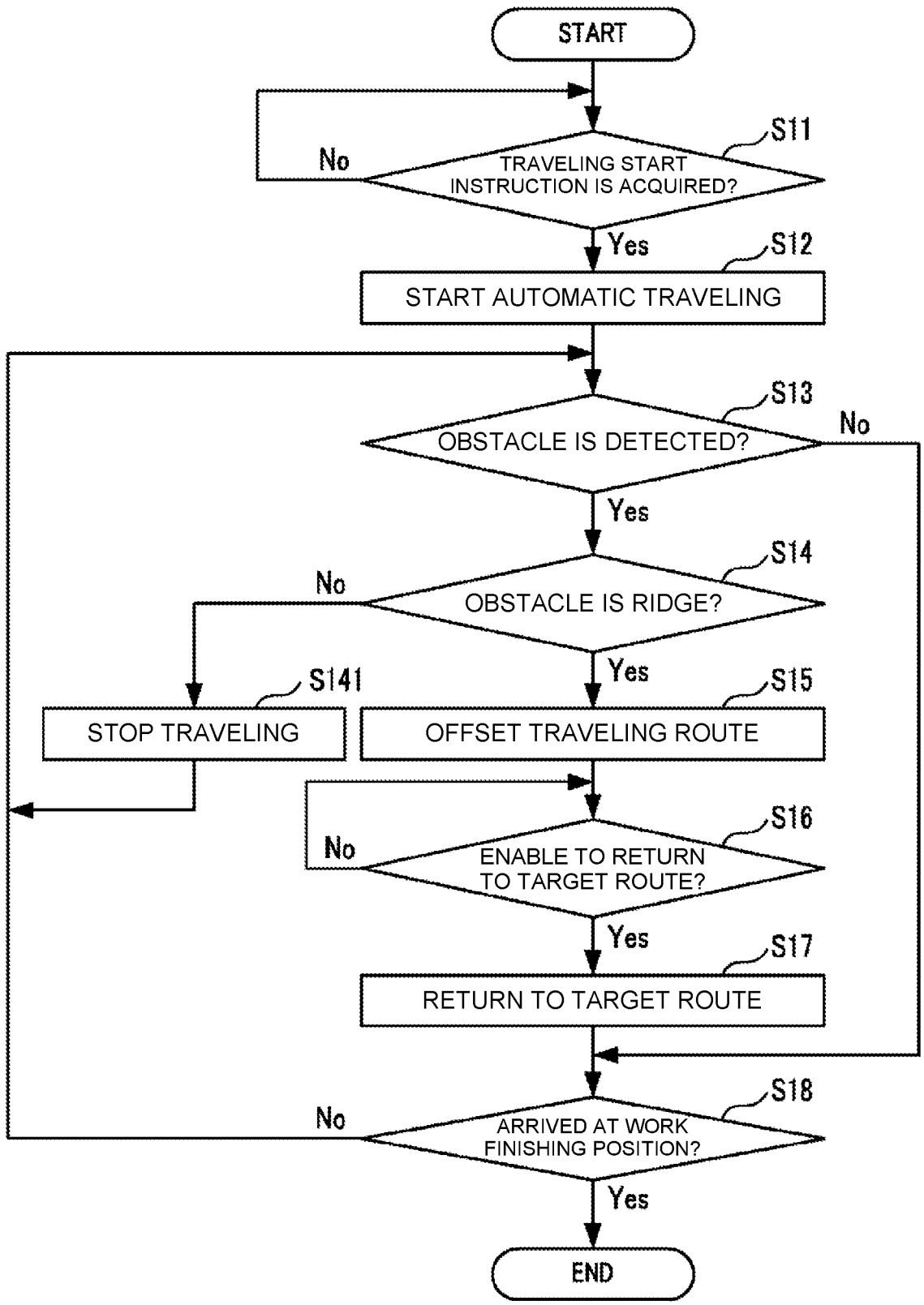
FIG. 9 is a flowchart illustrating an example of a procedure of automatic traveling processing to be performed by an automatic traveling system according to the first embodiment of the present invention.

In the following, an example of the automatic traveling processing to be performed by the automatic traveling system 1 is described with reference to FIG. 9.

Note that, the present invention can be described as an invention directed to an automatic traveling method in which one or more steps included in the automatic traveling processing are performed. Further, one or more steps included in the automatic traveling processing described herein may be omitted as appropriate. Note that, the order of execution of each step in the automatic traveling processing may be different, as far as similar advantageous effects are generated. Furthermore, although a case is described herein as an example, in which the vehicle control device 11 performs each step in the automatic traveling processing, an automatic traveling method in which one or more processors perform each step in the automatic traveling processing in a distributed manner is also considered as another embodiment.

First, in step S11, the vehicle control device 11 of the work vehicle 10 determines whether the traveling start instruction has been acquired from the operation terminal 20. When the vehicle control device 11 acquires the traveling start instruction (S11: Yes), the vehicle control device 11 proceeds the processing to step S12. The vehicle control device 11 waits until the traveling start instruction is acquired (S11: No).

In step S12, the vehicle control device 11 causes the work vehicle 10 to start automatic traveling. The vehicle control device 11 causes the work vehicle 10 to start automatic traveling along the target routes R (work routes Ra and Rb) from the work start position S. For example, the work vehicle 10 automatically travels along the work routes Ra and Rb in a state that the work machine 14 (planting unit) is lowered.

Next, in step S13, the vehicle control device 11 determines whether an obstacle is detected. Specifically, the vehicle control device 11 acquires measurement information from the obstacle detection unit 17, and determines whether an obstacle is included in the determination area (see FIG. 4A), based on the measurement information. In a case where the obstacle is detected (S13: Yes), the vehicle control device 11 proceeds the processing to step S14. On the other hand, in a case where the obstacle is not detected (S13: No), the vehicle control device 11 proceeds the processing to step S18. Note that, in a case where the obstacle detection unit 17 does not detect an obstacle, and in a case where the obstacle detection unit 17 detects an obstacle outside the determination area, the vehicle control device 11 proceeds the processing to step S18.

As another embodiment, the vehicle control device 11 may proceed the processing to step S14, in a case where an obstacle is detected a predetermined number of times or more within a predetermined time in the determination area.

In step S14, the vehicle control device 11 performs determination processing of determining whether a detected obstacle is the ridge A1. For example, the vehicle control device 11 detects an edge of an obstacle, based on a position and a shape of the obstacle detected from the measurement information, and determines whether the obstacle is the ridge A1, based on whether a boundary of the obstacle is continuous. In a case where the vehicle control device 11 determines that the obstacle is the ridge A1 (S14: Yes), the vehicle control device 11 proceeds the processing to step S15. For example, as illustrated in FIG. 6, when the vehicle control device 11 detects a protruding portion of the ridge A1, while the work vehicle 10 is automatically traveling on the outermost periphery of the field F along the ridge A1, the vehicle control device 11 determines that the obstacle is the ridge A1.

On the other hand, in a case where the vehicle control device 11 determines that the obstacle is not the ridge A1 (S14: No), the vehicle control device 11 proceeds the processing to step S141. Upon proceeding to step S141, the vehicle control device 11 stops the work vehicle 10, and thereafter, in a case where the obstacle has moved, or in a case where an instruction operation by the operator is accepted, the vehicle control device 11 returns the processing to step S13, and causes the work vehicle 10 to resume automatic traveling.

In step S15, the vehicle control device 11 offsets the target route R. For example, as illustrated in FIG. 6, the vehicle control device 11 sets the avoidance route r1 to a position offset by a distance (offset amount L1) according to a protruding width of a protruding portion of the ridge A1. After setting the avoidance route r1, the vehicle control device 11 causes the work vehicle 10 to automatically travel along the avoidance route r1 (see FIG. 7). The vehicle control device 11 may also set a traveling speed of the work vehicle 10 in the avoidance route r1 to a slower speed (e.g., 1.2 m/s) than the traveling speed (e.g., 1.8 m/s) of the work vehicle 10 in the target route R. This can ensure safety of automatic traveling in the avoidance route r1.

Next, in step S16, the vehicle control device 11 determines whether it is possible to return the work vehicle 10 to the target route R (work route Rb). For example, in a case where the work vehicle 10 travels straight ahead along the avoidance route r1, and no obstacle (ridge A1) is detected within the determination area (see FIG. 4A), the vehicle control device 11 determines that it is possible to return the work vehicle 10 to the target route R. When the vehicle control device 11 determines that it is possible to return the work vehicle 10 to the target route R (S16: Yes), the vehicle control device 11 proceeds the processing to step S17. On the other hand, when the vehicle control device 11 determines that the ridge A1 is included in the determination area, and it is not possible to return the work vehicle 10 to the target route R, automatic traveling along the avoidance route r1 (see FIG. 7) is continued (S16: No).

In step S17, the vehicle control device 11 returns the work vehicle 10 from the avoidance route r1 to the original target route R (work route Rb), and causes the work vehicle 10 to resume automatic traveling along the target route R.

Next, in step S18, the vehicle control device 11 determines whether the work vehicle 10 has reached the work end position G. For example, the vehicle control device 11 terminates the processing, when the work vehicle 10 reaches the work end position G (S18: Yes). The vehicle control device 11 continues the above-described pieces of processing (S13 to S17) until the work vehicle 10 reaches the work end position G (S18: No). The vehicle control device 11 performs the automatic traveling processing as described above.

As described above, the automatic traveling system 1 and the automatic traveling method according to the present embodiment performs: causing the work vehicle 10 to automatically travel along the target route R set within the field F; detecting an obstacle located on an outer periphery of the field F, while the work vehicle 10 is traveling along the target route R in an outer peripheral area (headland area Fb) of the field F; and causing the work vehicle 10 to travel along the avoidance route r1 inside the field F than the target route R, in a case where the obstacle is an object to be avoided (e.g., the ridge A1).

According to the above configuration, it is possible to cause the work vehicle 10 to automatically travel along the ridge A1 located, for example, on an outer periphery of the field F, within an outermost peripheral area of the field F. Also, even in a case where the work vehicle 10 approaches the ridge A1, it is possible to cause the work vehicle 10 to automatically travel along the avoidance route r1 away from the ridge A1. Therefore, it is possible to continue automatic traveling without stopping the work vehicle 10. Since it becomes possible to cause the work vehicle 10 to automatically travel in the entirety of the field F, work efficiency of the work vehicle 10 can be improved.

Figure 10:
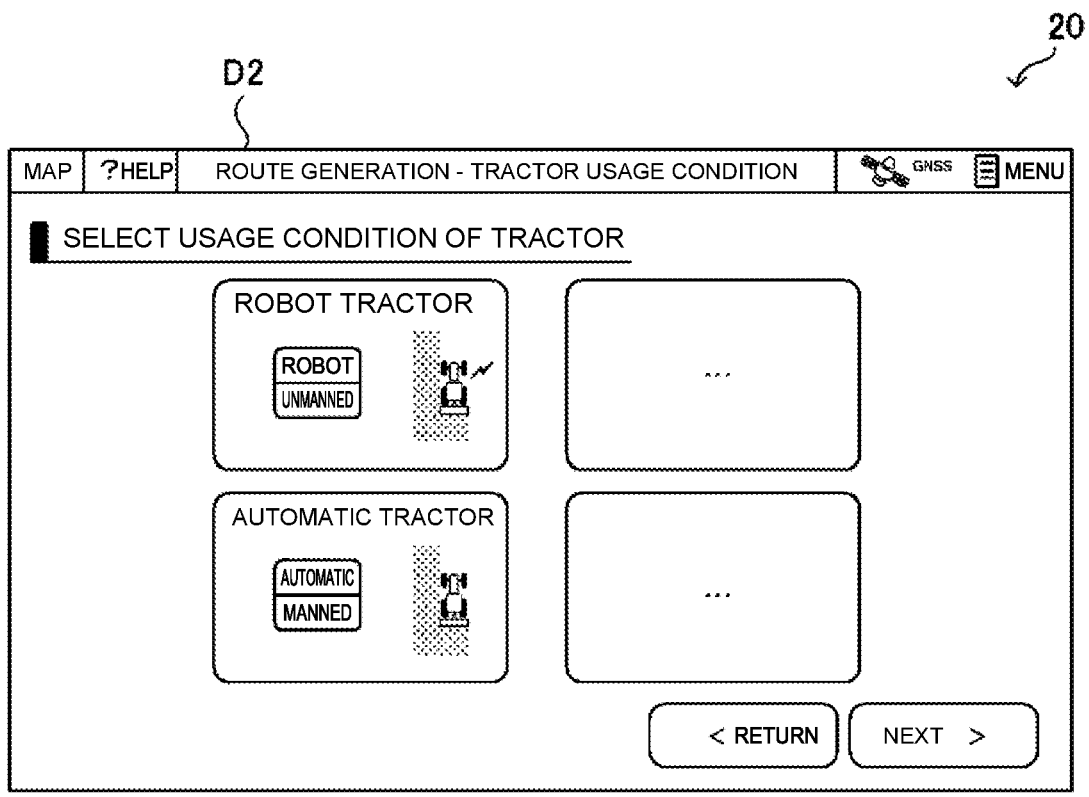
FIG. 10 is a diagram illustrating an example of the operation screen to be displayed on the operation terminal according to the embodiment of the present invention.

Herein, the work vehicle 10 may be configured to be selectable between a traveling mode (unmanned traveling mode) in which the work vehicle 10 automatically travels without an operator on board, and a traveling mode (manned traveling mode) in which the work vehicle 10 automatically travels with an operator on board. In this case, the operator selects either "robot tractor" associated with the unmanned traveling mode, or "automatic tractor" associated with the manned traveling mode on an operation screen D2 (see FIG. 10) of the operation terminal 20.

The vehicle control device 11 may perform processing of detecting the obstacle, based on the traveling mode. Specifically, in a case where the traveling mode is set to the manned traveling mode, the vehicle control device 11 performs processing of determining whether the obstacle is an object to be avoided, in a case where a distance between the work vehicle 10 and the obstacle becomes equal to or less than a first set distance. For example, in a case where a distance to an obstacle detected by the detection processing unit 112 is 15 cm or less, the determination processing unit 113 determines whether the obstacle is the ridge A1. Then, in a case where the obstacle is the ridge A1, the traveling processing unit 111 causes the work vehicle 10 to travel while avoiding the obstacle. On the other hand, in a case where the distance to the obstacle detected by the detection processing unit 112 exceeds 15 cm, the determination processing unit 113 does not perform processing of determining whether the obstacle is the ridge A1. In this case, the traveling processing unit 111 maintains automatic traveling of the work vehicle 10 along the target route R.

In contrast, in a case where the traveling mode is set to the unmanned traveling mode, the vehicle control device 11 determines whether an obstacle is an object to be avoided, in a case where the distance between the work vehicle 10 and the obstacle becomes equal to or less than a second set distance. For example, in a case where the distance to the obstacle detected by the detection processing unit 112 is 30 cm or less, the determination processing unit 113 determines whether the obstacle is the ridge A1. Then, in a case where the obstacle is the ridge A1, the traveling processing unit 111 causes the work vehicle 10 to travel while avoiding the obstacle. On the other hand, in a case where the distance to the obstacle detected by the detection processing unit 112 exceeds 30 cm, the determination processing unit 113 does not perform processing of determining whether the obstacle is the ridge A1. In this case, the traveling processing unit 111 maintains automatic traveling of the work vehicle 10 along the target route R.

In this way, in a case where the operator boards the work vehicle 10, the vehicle control device 11 performs determination (determination processing) as to whether an obstacle is an object to be avoided, in a case where a distance between the work vehicle 10 and the object to be avoided becomes equal to or less than the first set distance; and in a case where the operator does not board the work vehicle 10, the vehicle control device 11 performs the determination processing, in a case where the distance between the work vehicle 10 and the object to be avoided becomes equal to or less than the second set distance, which is greater than the first set distance. Also, in a case where the operator boards (in a case of the manned traveling mode), the operator can visually check the distance to the object to be avoided (ridge A1). Therefore, a determination threshold value for avoidance traveling can be set to a value smaller than that in a case where the operator does not board (in a case of the unmanned traveling mode).

As another embodiment, the vehicle control device 11 may perform processing of determining whether an obstacle is the ridge A1, in a case where the obstacle is detected a predetermined number of times or more within a predetermined time in the determination area. The vehicle control device 11 may also set the predetermined time and the predetermined number of times according to the traveling mode. For example, the predetermined time in a case where the operator boards (in a case of the manned travel mode) may be set to a time longer than the predetermined time in a case where the operator does not board (in a case of the unmanned travel mode), and the predetermined number of times in a case where the operator boards (in a case of the manned travel mode) may be set to the number of times larger than the predetermined number of times in a case where the operator does not board (in a case of the unmanned travel mode). In this way, as with a case of the determination threshold value for avoidance traveling, in a case where the operator boards (in a case of the manned traveling mode), the operator can visually check the distance to the object to be avoided (ridge A1). Therefore, threshold values of the predetermined time and the predetermined number of times can be set to values larger than those in a case where the operator does not board (in a case of the unmanned traveling mode).

Second Embodiment

An automatic traveling system 1 according to the second embodiment of the present invention is described. In the automatic traveling system 1 according to the second embodiment, an obstacle detection unit 17 is constituted of a physical sensor, and other configuration is the same as that of the automatic traveling system 1 according to the first embodiment. In the following, differences from the automatic traveling system 1 according to the first embodiment are mainly described.

As illustrated in FIG. 4B, obstacle detection units 17L and 17R, each of which is constituted of a physical sensor (such as a contact sensor or a switch), are provided on a left side surface and a right side surface of a vehicle body unit 13 of a work vehicle 10, respectively. The obstacle detection units 17L and 17R transmit a detection result (detection signal) to a vehicle control device 11, in a case where the obstacle detection units 17L and 17R detect a contact with an obstacle.

A detection processing unit 112 acquires a detection result from the obstacle detection units 17L and 17R. For example, as illustrated in FIG. 11, in a case where a protruding portion of a ridge A1 comes into contact with the obstacle detection unit 17L, while the work vehicle 10 is automatically traveling along a work route Rb on the outermost periphery of a headland area Fb, the obstacle detection unit 17L transmits a detection signal to the vehicle control device 11, and the detection processing unit 112 acquires the detection signal.

When the detection processing unit 112 acquires the detection signal, a determination processing unit 113 determines that the obstacle is the ridge A1. For example, the determination processing unit 113 determines that the obstacle is the ridge A1 (object to be avoided), in a case where the detection processing unit 112 acquires the detection signal a predetermined number of times.

The predetermined number of times may be set according to the traveling mode (the manned traveling mode or the unmanned traveling mode). For example, in a case where the traveling mode is the manned traveling mode, the determination processing unit 113 determines that the obstacle is the ridge A1, in a case where the detection processing unit 112 successively acquires the detection signal three times. On the other hand, in a case where the traveling mode is the unmanned traveling mode, the determination processing unit 113 determines that the obstacle is the ridge A1, in a case where the detection processing unit 112 acquires the detection signal once. As another method of determining the ridge A1, the determination processing unit 113 may determine whether the obstacle is the ridge A1, based on an interval at which the detection signal is acquired. For example, the determination processing unit 113 acquires the detection signal with respect to a predetermined traveling distance of the work vehicle 10 to be computed by a rotation sensor (not illustrated) of a traveling wheel, and determines that the obstacle is the ridge A1, in a case where an interval between the successive detection signals is shorter than a threshold value.

Figure 11:
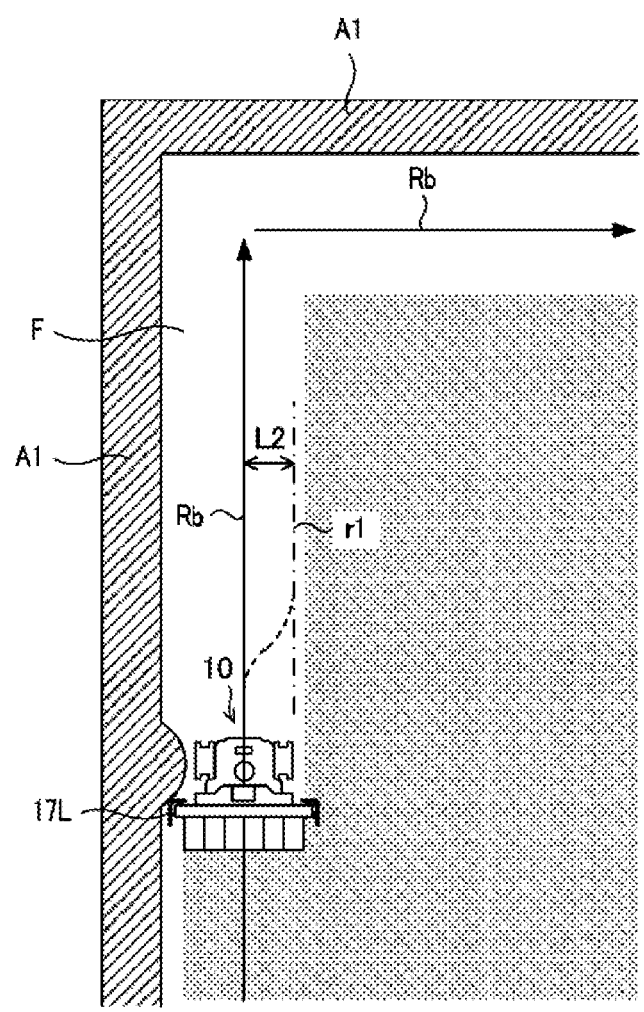
FIG. 11 is a diagram illustrating an example of a traveling method of a work vehicle according to the second embodiment of the present invention.

When the determination processing unit 113 determines that the obstacle is the ridge A1, a traveling processing unit 111 sets an avoidance route r1, and changes the traveling direction of the work vehicle 10 to the direction of the avoidance route r1 (see FIG. 11). This allows the work vehicle 10 to move from a position where the ridge A1 is detected to the avoidance route r1, and to automatically travel along the avoidance route r1 (see FIG. 11).

After causing the work vehicle 10 to travel along the avoidance route r1 for a predetermined time or by a predetermined distance, the traveling processing unit 111 returns the work vehicle 10 to a target route R (work route Rb). The predetermined time and the predetermined distance are set in advance. For example, the predetermined time and the predetermined distance are set in advance based on information such as a shape of a field F and a shape of the ridge A1 to be measured when registering the field F.

As another embodiment, the predetermined time or the predetermined distance may be set to a first threshold value in a case of the manned traveling mode, and the predetermined time or the predetermined distance may be set to a second threshold value being greater than the first threshold value in a case of the unmanned traveling mode. In this way, since the operator can visually check the distance to an object to be avoided (ridge A1) in a case of the manned traveling mode, a threshold value of the predetermined time or the predetermined distance may be set to a value smaller than that in a case of the unmanned traveling mode.

Further as another embodiment, in a case of the manned traveling mode, the obstacle detection unit 17 may determine that an obstacle is an object to be avoided, in a case where the work vehicle 10 comes into contact with the obstacle a first predetermined number of times; and in a case of the unmanned traveling mode, the obstacle detection unit 17 may determine that an obstacle is an object to be avoided, in a case where the work vehicle 10 comes into contact with the obstacle a second predetermined number of times, which is less than the first predetermined number of times. In this way, since the operator can visually check the distance to an object to be avoided (ridge A1), in a case where the operator boards (in a case of the manned traveling mode), a threshold value of the predetermined number of times can be set to a value larger than that in a case where the operator does not board (in a case of the unmanned traveling mode).

Figure 12:
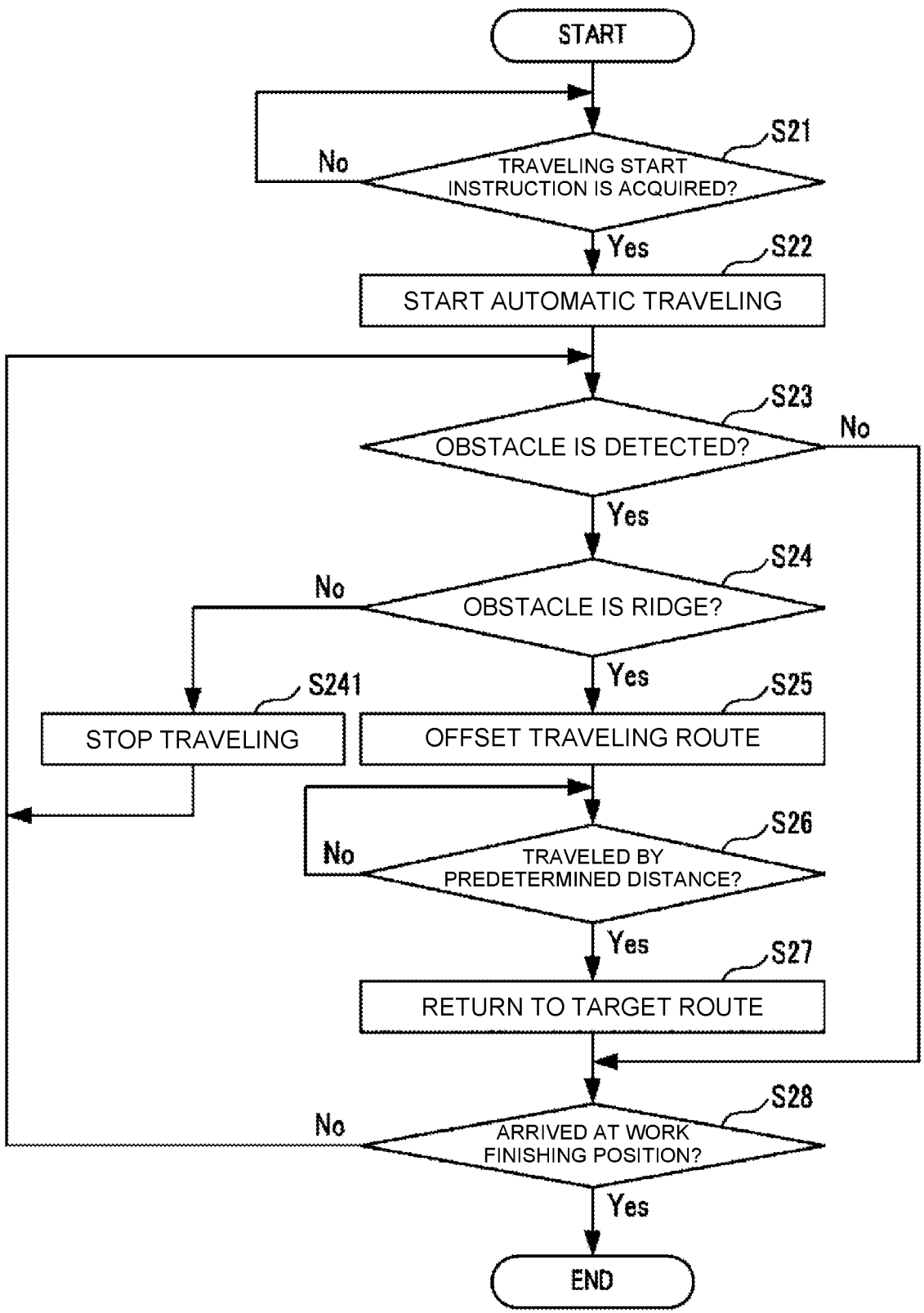
FIG. 12 is a flowchart illustrating an example of a procedure of automatic traveling processing to be performed by an automatic traveling system according to the second embodiment of the present invention.

FIG. 12 is a flowchart illustrating an example of the automatic traveling processing to be performed in the automatic traveling system 1 according to the second embodiment. Herein, differences from the automatic traveling processing to be performed in the automatic traveling system 1 according to the first embodiment illustrated in FIG. 9 are described.

When the vehicle control device 11 acquires the traveling start instruction from an operation terminal 20 (S21: Yes), and automatic traveling is started (S22), the vehicle control device 11 determines whether an obstacle is detected in step S23. For example, when the vehicle control device 11 acquires a detection signal from the obstacle detection unit 17, in a case where an obstacle comes into contact with the obstacle detection unit 17, the vehicle control device 11 determines that an obstacle has been detected (S23: Yes).

When an obstacle is detected (S23: Yes), the vehicle control device 11 determines whether the obstacle is the ridge A1. For example, the vehicle control device 11 determines that the obstacle is the ridge A1, in a case where the detection signal is successively acquired a predetermined number of times within a predetermined time (S24: Yes). Also, for example, the vehicle control device 11 may determine that the obstacle is not the ridge A1 (such as a person), in a case where the detection signal is acquired only once within a predetermined time (S24: No).

In step S25, the vehicle control device 11 offsets the target route R. For example, as illustrated in FIG. 11, the vehicle control device 11 sets the avoidance route r1 to a position offset by a preset distance (offset amount L2). The offset amount L2 may be set in advance based on information such as a shape of the field F and a shape of the ridge A1 to be measured when registering the field F. When the vehicle control device 11 sets the avoidance route r1, the work vehicle 10 is caused to automatically travel along the avoidance route r1 (see FIG. 11).

Note that, the vehicle control device 11 may offset the work vehicle 10, while the obstacle detection unit 17 repeatedly comes into contact with a protruding portion of the ridge A1, and may set the avoidance route r1 to a position where the obstacle detection unit 17 no longer comes into contact with the protruding portion.

Next, in step S26, the vehicle control device 11 determines whether the work vehicle 10 has traveled along the avoidance route r1 by a predetermined distance. In a case where the work vehicle 10 has traveled along the avoidance route r1 by a predetermined distance (S26: Yes), the vehicle control device 11 returns the work vehicle 10 from the avoidance route r1 to the original target route R (work route Rb), and causes the work vehicle 10 to resume automatic traveling along the target route R (S27).

As another embodiment, in a case where the work vehicle 10 has traveled along the avoidance route r1 for a predetermined time, the vehicle control device 11 may return the work vehicle 10 from the avoidance route r1 to the original target route R (work route Rb). The predetermined distance and the predetermined time may be set based on a traveling distance and a traveling time required for the work vehicle 10 to pass an object to be avoided, for example, in a case where the object to be avoided is an object to be avoided such as a water intake, whose outer shape can be generally recognized.

Other processing in automatic traveling processing according to the second embodiment is the same as that in automatic traveling processing according to the first embodiment.

Also in the automatic traveling system 1 according to the second embodiment, similarly to the automatic traveling system 1 according to the first embodiment, even in a case where the work vehicle 10 approaches the ridge A1, it is possible to cause the work vehicle 10 to automatically travel along the avoidance route r1 away from the ridge A1. Therefore, it is possible to continue automatic traveling without stopping the work vehicle 10. Thus, since it is possible to cause the work vehicle 10 to automatically travel within the entirety of the field F, work efficiency of the work vehicle 10 can be improved.

Note that, an object to be avoided according to the present invention is not limited to the ridge A1, but may be a water intake or a fixed object located near a boundary of the field F. Also, an object to be avoided according to the present invention may be an obstacle that is difficult to be detected at a time of registering the field F, unlike an obstacle (structure such as a steel tower) that can be detected at a time of registering the field F.

In the first and second embodiments described above, the vehicle control device 11 may output a warning sound, in each of a case where the ridge A1 is detected, a case where the work vehicle 10 automatically travels along the avoidance route r1, and a case where the work vehicle 10 returns from the avoidance route r1 to the target route R. The vehicle control device 11 may also output a warning sound in a different manner between a warning sound in a case where an obstacle is the ridge A1, and a warning sound in a case where an obstacle is an object (such as a person) other than the ridge A1. The vehicle control device 11 may also output an audio guidance. For example, the vehicle control device 11 may output an audio sound "the ridge A1 has been detected", in a case where the ridge A1 has been detected, and may continuously output an audio sound "the work vehicle 10 is traveling along the avoidance route" until the work vehicle 10 returns to the original target route R, while the work vehicle 10 is automatically traveling along the avoidance route r1.

In the first and second embodiments described above, the obstacle detection unit 17 may be further provided in front of the vehicle body unit 13. This enables to detect an obstacle in a forward direction of the work vehicle 10. For example, when the work vehicle 10 turns and travels along the work route Rb on the outermost periphery of the field F, in a case where the obstacle detection unit 17 in the forward direction detects an obstacle, and the obstacle is the ridge A1, the vehicle control device 11 may cause the work vehicle 10 to turn and travel along an avoidance route (avoidance turning route) that is offset from the work route Rb.

Each function of the vehicle control device 11 according to the present embodiment may be disposed outside the work vehicle 10, or may be included in the operation control unit 21 of the operation terminal 20. In other words, in the embodiment described above, the vehicle control device 11 is equivalent to an automatic traveling system according to the present invention, but the automatic traveling system according to the present invention may be constituted of the operation terminal 20 alone. The automatic traveling system according to the present invention may also be configured to include the work vehicle 10 and the operation terminal 20. Also, each function of the vehicle control device 11 may be included in a server communicable with the work vehicle 10.

REFERENCE SIGNS LIST

1: Automatic traveling system
10: Work vehicle
11: Vehicle control device
13: Vehicle body unit
14: Work machine
16: Positioning device
17: Obstacle detection unit
20: Operation terminal
21: Operation control unit
111: Traveling processing unit
112: Detection processing unit
113: Determination processing unit
211: Setting processing unit
212: Output processing unit
F: Field
Fa: Inner area
Fb: Headland area (outer peripheral area)
A1: Ridge (object to be avoided)
R: Target route
Ra: Work route
Rb: Work route
r1: Avoidance route
L1: Offset amount
L2: Offset amount

The invention claimed is:

1. An automatic traveling method comprising:
causing a work vehicle to automatically travel along a target route set within a field;
detecting an obstacle located on an outer periphery of the field, while the work vehicle is traveling along the target route in an outer peripheral area of the field;
in a case where the obstacle is an object to be avoided, causing the work vehicle to travel along an avoidance route that is located in the inner side of the target route in the field relative to the outer peripheral area of the field;
in a case where an operator boards the work vehicle and where a distance between the work vehicle and the obstacle becomes equal to or less than a first set distance, performing processing of determining whether the obstacle is the object to be avoided; and
in a case where an operator does not board the work vehicle and where the distance between the work vehicle and the obstacle becomes equal to or less than a second set distance being greater than the first set distance, performing processing of determining whether the obstacle is the object to be avoided.

2. The automatic traveling method according to claim 1, wherein
in a case where the obstacle detected while the work vehicle is traveling along the target route in the outer peripheral area of the field is the object to be avoided, the avoidance route is set to a position where the target route is offset to the inside of the field.

3. The automatic traveling method according to claim 2, wherein
in a case where the obstacle partially protruding into the field, and being detected while the work vehicle is traveling along the target route in the outer peripheral area of the field is the object to be avoided, the avoidance route is set to a position where the target route is offset by a distance according to a protruding width of the obstacle.

4. The automatic traveling method according to claim 1, wherein
in a case where the work vehicle travels along the avoidance route, and has passed the object to be avoided, the work vehicle is returned to the target route.

5. The automatic traveling method according to claim 1, wherein
the work vehicle is returned to the target route after the work vehicle is caused to travel along the avoidance route for a predetermined time or by a predetermined distance.

6. The automatic traveling method according to claim 5, wherein
in a case where an operator boards the work vehicle, the predetermined time or the predetermined distance is set to a first threshold value, and
in a case where an operator does not board the work vehicle the predetermined time or the predetermined distance is set to a second threshold value being greater than the first threshold value.

7. The automatic traveling method according to claim 5, wherein
in a case where an operator boards the work vehicle and where a detection unit installed in the work vehicle comes into contact with the obstacle a first predetermined number of times, the obstacle is determined to be the object to be avoided in a case, and
in a case where an operator does not board the work vehicle and where the detection unit comes into contact with the obstacle a second predetermined number of times being less than the first predetermined number of times, the obstacle is determined to be the object to be avoided in a case.

8. The automatic traveling method according to claim 1, further comprising:
detecting the obstacle; and
determining whether the obstacle is a ridge, wherein
in a case where the obstacle is determined to be the ridge, the work vehicle is caused to travel along the avoidance route, and
in a case where the obstacle is determined not to be the ridge, the work vehicle is stopped.

9. An automatic traveling system comprising:
a traveling processing unit that causes a work vehicle to automatically travel along a target route set within a field; and
a detection processing unit that detects an obstacle located on an outer periphery of the field, while the work vehicle is traveling along the target route in an outer peripheral area of the field, wherein
in a case where the obstacle is an object to be avoided, the traveling processing unit causes the work vehicle to travel along an avoidance route that is located in the inner side of the target route in the field relative to the outer peripheral area of the field;
in a case where an operator boards the work vehicle and where a distance between the work vehicle and the obstacle becomes equal to or less than a first set distance, processing of determining whether the obstacle is the object to be avoided is performed; and
in a case where an operator does not board the work vehicle and where the distance between the work vehicle and the obstacle becomes equal to or less than a second set distance being greater than the first set distance, processing of determining whether the obstacle is the object to be avoided is performed.

10. A computer-readable non-transitory medium storing an automatic traveling program causing one or more processors to execute:

causing a work vehicle to automatically travel along a target route set within a field:
detecting an obstacle located on an outer periphery of the field, while the work vehicle is traveling along the target route in an outer peripheral area of the field;
in a case where the obstacle is an object to be avoided, causing the work vehicle to travel along an avoidance route that is located in the inner side of the target route in the field relative to the outer peripheral area of the field;
in a case where an operator boards the work vehicle and where a distance between the work vehicle and the obstacle becomes equal to or less than a first set distance, processing of determining whether the obstacle is the object to be avoided is performed; and
in a case where an operator does not board the work vehicle and where the distance between the work vehicle and the obstacle becomes equal to or less than a second set distance being greater than the first set distance, processing of determining whether the obstacle is the object to be avoided is performed.

* * * * *